United States Patent

Peter et al.

[11] Patent Number: 5,963,001
[45] Date of Patent: Oct. 5, 1999

[54] CIRCUIT ARRANGEMENT AND METHOD FOR OPERATING AN ADJUSTING DEVICE

[75] Inventors: Cornelius Peter, Buehl; Gerhard Knecht, Iffezheim, both of Germany

[73] Assignee: Robert Bosch GmbH, Stuttgart, Germany

[21] Appl. No.: 08/860,304

[22] PCT Filed: Nov. 25, 1995

[86] PCT No.: PCT/DE95/01672

§ 371 Date: Jun. 19, 1997

§ 102(e) Date: Jun. 19, 1997

[87] PCT Pub. No.: WO96/19858

PCT Pub. Date: Jun. 27, 1996

[30] Foreign Application Priority Data

Dec. 19, 1994 [DE] Germany .............................. 44 44 762

[51] Int. Cl.⁶ .................................. H02P 3/00; H02P 7/00
[52] U.S. Cl. .......................... 318/563; 318/280; 318/469; 318/466
[58] Field of Search .................................. 318/280–286, 318/362–370, 466–472, 484; 49/26, 28, 138

[56] References Cited

U.S. PATENT DOCUMENTS

| | | | |
|---|---|---|---|
| 4,633,153 | 12/1986 | Thornton et al. | 318/280 |
| 4,634,945 | 1/1987 | Takemura et al. | 318/434 |
| 5,387,851 | 2/1995 | Nuscheler et al. | 318/135 |
| 5,399,950 | 3/1995 | Lu et al. | 318/565 |
| 5,404,673 | 4/1995 | Takeda et al. | 49/28 |
| 5,539,290 | 7/1996 | Lu et al. | 318/565 |
| 5,640,072 | 6/1997 | Miyazaki et al. | 318/282 |
| 5,701,063 | 12/1997 | Cook et al. | 318/469 |
| 5,714,853 | 2/1998 | Knab et al. | 318/265 |
| 5,731,675 | 3/1998 | McCarthy | 318/469 |
| 5,801,501 | 9/1998 | Redelberger | 318/283 |

FOREIGN PATENT DOCUMENTS 2902683  7/1979  Germany .

*Primary Examiner*—Paul Ip
*Attorney, Agent, or Firm*—Venable; Norman N. Kunitz

[57] ABSTRACT

A circuit arrangement and a method for operating an adjusting device (10, 11, 12) are proposed which ascertain a characteristic variable (38, 42) of the adjusting device (10, 11, 12) as a standard for the adjusting force or adjusting torque and if a limit value is exceeded furnish an overload signal (41, 45). According to the invention, the definition of the electrical power for the electric motor (10) is contemplated to a value that makes it possible to adhere to a specified spring rate in the event something becomes caught, which rate indicates the change in force referred to a change in travel distance. The adjustment travel of the part (12) to be adjusted is subdivided into travel intervals (I) which are considerably shorter than the total adjustment travel. The method evaluates a continuous change in the detected characteristic variable in a predetermined number of successive travel intervals (I) in order to ascertain an overload signal (41, 45). A preferred application of the circuit arrangement according to the invention and of the method according to the invention for operating an adjusting device (10, 11, 12) exists in a motor vehicle.

20 Claims, 1 Drawing Sheet

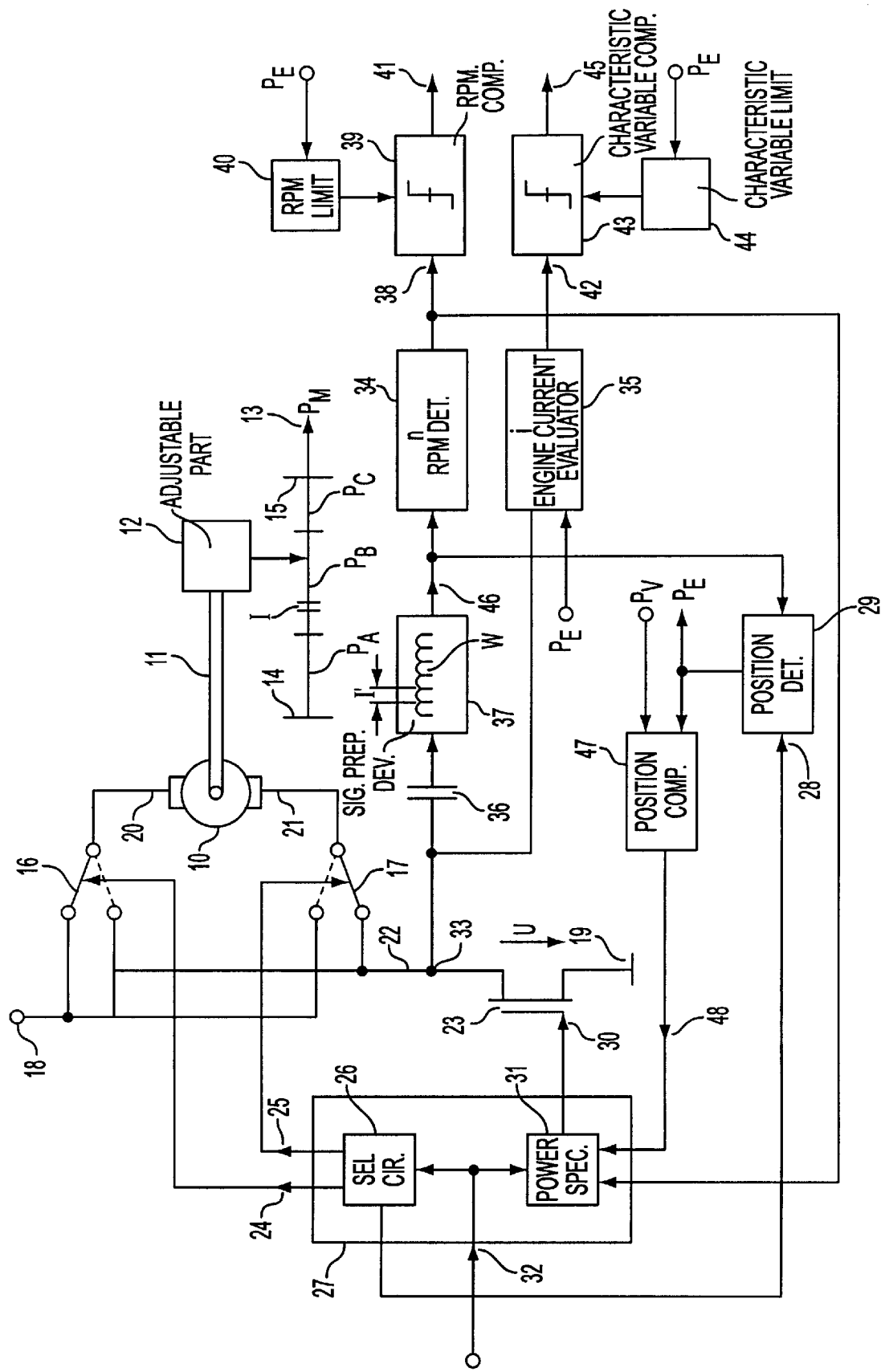

CIRCUIT ARRANGEMENT AND METHOD FOR OPERATING AN ADJUSTING DEVICE

This application is a 371 y PCT/DE95/01675 filed Nov. 25, 1995.

BACKGROUND OF INVENTION

The invention is based on a circuit arrangement and a method for operating an adjusting device driven by an electric motor, which drives at least one adjustable part at which the danger that an object or body part will become caught originates, having an evaluation arrangement that ascertains at least one characteristic variable of the adjusting device as a standard for the adjusting force or adjusting torque and compares it with at least one limit value and if the limit value is exceeded outputs an overload signal. From Published, Non-Examined German Patent Application DE-OS 29 02 683, a control circuit for a window raiser of a motor vehicle is known that in ascertaining an overload signal takes into account the ascertainment of the current flowing through the electric motor of the adjusting device. The motor current is a characteristic variable of the adjusting device and indicates a standard for a force or torque occurring in the adjusting device. A division of the adjusting path into two ranges is provided. In a first range, the detected motor current is utilized to define a limit value, the exceeding of which leads in the second range to tripping of the overload signal. The overload signal on the one hand guards the electric motor against thermal overload and on the other guards against anything becoming caught. The electrical drive power of the electric motor should be defined such that the adjusting force or torque required for the adjusting device can be brought to bear. The catch guard assures that the catching force that acts on an object or on parts of the body of persons is limited to a predetermined value. A further variable in the event of something becoming caught is the spring rate, which indicates the change in force or torque referred to the distance travelled when something gets caught until the overload signal is tripped.

The object of the invention is to provide a circuit arrangement and a method for operating an adjusting device of the type mentioned above, which enable reliable operation and meet a stringent safety demand.

SUMMARY OF THE INVENTION

The above is attained according to a first aspect of the invention by a circuit arrangement for operating an adjusting device driven by an electric motor, which drives at least one adjustable part at which the danger that an object or body part will become caught originates, having an evaluation arrangement that ascertains at least one characteristic variable of the adjusting device as a standard for the adjusting force or adjusting torque and compares it with at least one limit value and if the limit value is exceeded outputs an overload signal, and wherein a means for a power specification is provided for defining the electrical power of the electric motor, which means defines the power as a function of a specified spring rate of the article or body part caught to a value that makes it possible to adhere to a specifiable maximum catching force exerted on the caught object or the caught body part.

The above object is achieved according to a second aspect of the invention by a method for operating an adjusting device driven by an electric motor, which drives at least one adjustable part at which the danger that an object or body part will become caught originates, having an evaluation arrangement that ascertains at least one characteristic variable of the adjusting device as a standard for the adjusting force or adjusting torque and compares it with at least one limit value and if the limit value is exceeded outputs an overload signal, and having a position detector, which furnishes a position signal that represents a position of a part to be adjusted of the adjusting device, and wherein the electrical power made available to the electric motor is defined, as a function of a specified spring rate of a caught object or body part, at a value that makes it possible to adhere to a specifiable maximum catching force; the adjustment travel of the part to be adjusted is subdivided into a predetermined number of travel intervals (I), whose length is considerably shorter than the total adjustment travel, and the overload signal is output if, in a specified number of successive travel intervals (I), a continuous change in the ascertained standard for the adjusting force or adjusting torque in the direction of exceeding a limit value has occurred.

ADVANTAGES OF THE INVENTION

The circuit arrangement according to the invention has the advantage that the adjusting device makes it at least possible to adhere to a specified spring rate.

The electric motor present in an adjusting device is typically connected directly to the terminals of an energy source, for instance via relays. The electric motor is furnished with the full electrical power, which as a result of the electrical characteristic data of the electric motor is located within a given scope. In tests it has been found that an adjusting device operated in this way does not under all operating conditions make it possible to adhere to a specified spring rate that indicates a force change or torque change referred to the distance travelled when something gets caught until the overload signal is tripped. Particularly if hard objects are caught, the inertia of the adjusting device means that a standard for the adjusting force or adjusting torque can be exceeded in comparison with a predetermined limit. According to the invention, it is contemplated that the electrical power furnished to the electric motor is defined at a value that makes it possible to adhere to a specified spring rate. Regardless of production deviations, the specified spring rates can be enabled with existing adjusting devices; in an individual case, reducing the power supplied to the electric motor compared with the theoretically maximum power should be done.

The definition of the electrical power takes into account overall the reaction capability of the adjusting device, which is determined in particular by the stored energy of motion both in the electric motor and in the drive device and in the part to be adjusted.

The overload signal can be used to turn off the electric motor. In a catch guard, the overload signal preferably causes the reversal of the electric motor. Optionally, a distinction is provided between a shutoff and a reversal as a function of the position of the part to be adjusted.

Advantageous further features and embodiments of the circuit arrangement according to the invention are disclosed and recited in from the dependent claims.

An especially advantageous further development provides that the power furnished to the electric motor is predetermined as a function of a position of the part to be adjusted by the adjusting device. The quantitative power is defined in particular by experimentation. The position-related definition of the electrical power allows the adjusting device to move the part to be adjusted with a high adjusting speed at positions in which it is possible to adhere to the specified spring rate without a reduction in power compared with the full power.

The electrical power of the electric motor can be varied continuously, as a function of the position of the part to be adjusted, with a power specification signal. One advantageous provision contemplates the specification of at least two discrete power stages using the power specification signal.

Another further advantageous development provides that the adjusting range of the part to be adjusted is divided up into a plurality of positional ranges. A power specification, and in particular a power reduction for the electric motor, is contemplated only in specified ranges. The position of range division in combination with the specification of at least two discrete power stages has the advantage of being simple to realize.

One standard for the adjusting force or adjusting torque of the adjusting device, as an example, is the current flowing through the electric motor, which is preferably derived from the motor current ripple. Another standard for the adjusting force or adjusting torque is an rpm that occurs in the adjusting device and that is simultaneously preferably derived from the engine current ripple.

Reducing the electrical power furnished to the electric motor at specified positions or positional ranges compared with other positions or positional ranges in which no reduction is contemplated is preferably defined by experimentation and preferably takes into account operating data of the adjusting device. Suitable examples of operating data are the motor power or the motor current, which can be detected at a position or in a positional range without any power reduction, or an rpm that occurs within the adjusting device. For instance, to proceed from an rpm level of 3000 rpm to an rpm level of 1000 rpm, the power furnished to the electric motor can be defined at an experimentally ascertained value of 40%, for instance, while at a starting rpm level of 2000 rpm, the power furnished to the electric motor should be limited to 60% of the full power, in order once again to arrive at an rpm level of 1000 rpm. It is assumed in this example that an rpm level of 1000 rpm makes it possible to adhere to the specified spring rate.

One simple realization of operation with reduced electrical power is possible with clocked operation of a semiconductor power component, through which the motor current flows. In clocked operation, the semiconductor power component is turned completely on and off at a variable frequency and/or with a variable duty cycle. The semiconductor power component thus acts like a current source, which allows a medium current flowing through the electric motor.

The use of the semiconductor power component, such as a power field effect transistor, makes it simple and economical to detect both the motor current and an rpm. What is evaluated is the voltage drop that occurs at the semiconductor power component as a consequence of the current flow.

Ascertaining the standard for the adjusting force or adjusting torque from the engine current and/or rpm, for instance, can be done in the most various ways. One suitable example is comparing the motor current or the rpm with a fixedly specified limit value. The limit value definition is expediently done by an adaptation process, which takes into account the course of the standard for the adjusting force or adjusting torque, for instance, from a preceding adjusting operation. Especially suitable are evaluations of changes in the motor current or rpm, for instance, which may optionally be taken into account as well. In the changes, both chronological and location-related changes can be evaluated.

The method according to the invention for operating the adjusting device is especially well suited to controlling a hard catching event. The method according to the invention has recourse to the apparatus characteristics of the adjusting device, which pertain to ascertaining the characteristic variable for the standard of the adjusting force or adjusting torque, the positional ascertainment for the position of the part to be adjusted, and the power specification for defining the electrical power of the electric motor. The method of the invention contemplates that a continuous increase in the ascertained standard for the adjusting force or adjusting torque, referred to successive travel intervals into which the adjustment travel of the part to be adjusted is divided should be considered an exceeding of the limit value, which leads to tripping of the overload signal.

Advantageous embodiments of the method of the invention will become apparent from the dependent method claims.

Dividing the adjusting path of the part to be adjusted can be done for instance directly from the position signal, which is furnished by the positional ascertainment and is subdivided into specified intervals. If provision is made for detecting the motor current, then the travel interval s preferably derived from the ripple in the engine current. Along with ascertaining the position of the part to be adjusted from the ripple of the engine current, the intervals between the individual waves of the ripple simultaneously provide a standard for the travel interval.

The circuit arrangement according to the invention and the method are suitable for use in adjusting devices that are preferably disposed in a motor vehicle. In this application, the motors used there are currently utilized up to the limit of loadability. In this application, reliability on detecting an overload state and a rapid reaction if something becomes caught are therefore especially essential.

Other advantageous further developments and embodiments of the circuit arrangement of the invention and of the method will become apparent from other dependent claims and from the ensuing description.

BRIEF DESCRIPTION OF THE DRAWING

The FIGURE is a block circuit diagram of a circuit arrangement according to the invention for operating an adjusting device.

DETAILED DESCRIPTION OF PREFERRED EMBODIMENT

The drawing shows an electric motor 10, which via a mechanical coupling 11 drives a part 12 to be adjusted. The part 12 to be adjusted can assume various positions $P_M$, which are represented in the drawing by a position scale 13. The adjustment travel of the part 12 to be adjusted is limited by end stops 14, 15 and is subdivided, in the exemplary embodiment shown, into three positional ranges $P_A$, $P_B$, $P_C$. Regardless of the division into the individual positional ranges $P_A$, $P_B$, $P_C$ the total adjusting travel is divided into travel intervals I. One such travel interval I is plotted, enlarged, in the drawing within the range $P_B$.

The electric motor 10 can be connected to an energy source, not shown in further detail, via a first and second reversing switch 16, 17 having a first and second terminal 18, 19. The first reversing switch 16 connects a first motor terminal 20 to either the first or the second terminal 18, 19. The second reversing switch 17 connects a second motor terminal 21 likewise to either the first or the second terminal 18, 19.

A switch element 23 at which a voltage drop U occurs is disposed in a line 22 leading from the reversing switches 16, 17 to the second terminal 19.

The two reversing switches 16, 17 are actuated via control signals 24, 25, which are output by a selection circuit 26 that is included in a control arrangement 27. The selection circuit 26 also outputs a rotational direction signal 28 to a position detector 29.

The switch element 23 is actuated by a switching signal 30, which is furnished by a power specification 31 included in the control arrangement 27. The selection circuit 26 included in the control arrangement 27 and the power specification 31 are acted upon by a positioning signal 32 delivered to the control arrangement 27.

A pickup 33 at the line 22 leading from the reversing switches 16, 17 to the switch element 23 is connected to both an rpm detector 34 and to an engine current evaluator 35. A capacitor 36 and a signal preparation device 37 are connected in series between the pickup 33 and the rpm detector 34.

The rpm detector 34 outputs an output signal 38 to an rpm comparator 39, which compares the output signal 38 with an rpm limit value 40, and if the limit value is exceeded outputs a first overload signal 41.

The motor current evaluator 35 as its output signal outputs a characteristic variable 42, ascertained from the motor current, to a characteristic variable comparator 43, which compares the characteristic variable 42 with a characteristic variable limit value 44 and if the limit value is exceeded outputs a second overload signal 45.

The rpm detector 34 is supplied with a ripple signal 46 that is furnished by the signal preparing means (circuit or device) 37. The ripple W that is the basis of the ripple signal 46 is schematically illustrated in the signal preparing means 37. The interval I' between the waves replicates a standard for a certain adjusting travel of the part 12 to be adjusted. The interval I' can correspond to the travel interval I. The ripple signal 46 is also supplied to the position detector 29. The position detector 29, as a standard for the position $P_M$ of the part 12, outputs the position signal $P_E$. The position signal $P_E$ is supplied to both a position comparator 47 and the motor current evaluator 35 and affects the limit values 40, 44. The position comparator 47 compares the position signal $P_E$ with specified positional ranges $P_V$ and outputs a power specification signal 48 to the power specification 31.

The circuit arrangement according to the invention for operating the adjusting device 10, 11, 12 functions as follows:

The electric motor 10 and the mechanical coupling 11 are part of the adjusting device 10, 11, 12, which is provided in order to put the part 12 to be adjusted into different positions $P_M$. The adjusting travel, limited by the end stops 14, 15, is divided in the exemplary embodiment into three positional ranges $P_A$, $P_B$, $P_C$. A considerably finer division than the positional ranges $P_A$, $P_B$, $P_C$ is provided by the travel interval I. The entire adjustment travel can be subdivided in the many such travel intervals I, which are preferably equal in size.

The mechanical coupling 11 is equivalent for instance to a gear and a step-down device, which from a rotary motion produces a reciprocating motion. The electric motor 10 can be operated in both directions of rotation. The specification of the directions of rotation is done via suitable control of the two reversing switches 16, 17, which connect the two motor terminals 20, 21 respectively to the two terminals 18, 19 of the energy source not shown in further detail.

The switching positions of the reversing switches 16, 17 are defined by the selection circuit 26, contained in the control arrangement 27, as a function of the positioning signal 32 and are imparted to the two reversing switches 16, 17 via the control signals 24, 25. The positioning signal 32 may for instance include an ON/OFF command, a left rotation/right rotation command, or a command regarding a continuous position specification. The exemplary embodiment shown in the drawing is directed to a kind of control in which the control arrangement 27 is not supplied with any feedback about the position $P_M$ of the part 12 to be adjusted. The expansion to feedback position control can be done by feeding back the positional signal $P_E$ to the control arrangement 27.

On the assumption of a direct current motor and a direct current energy source, the two directions of rotation of the electric motor 10 are obtained by reversing the polarization, via the reversing switches 16, 17. A rotation of the electric motor 10 in one direction is attained by connecting the first motor terminal 20 to the first terminal 18 of the energy source via the first reversing switch 16 and connecting the second motor terminal 21 to the second terminal 19 of the energy source via the second reversing switch 17. On a change of the direction of rotation, the reversing switches 16, 17 are switched over to the respectively other positions by means of the control signals 24, 25, so that the first motor terminal 20 is connected to the second terminal 19 of the energy source via the first reversing switch 16 and the second motor terminal 21 is connected to the first terminal 18 of the energy source via the second reversing switch 17.

A shutdown of the electric motor 10 can be attained by connecting both motor terminals 20, 21 either to the first terminal 18 or to the second terminal 19 of the energy source. The electric motor 10 is then short-circuited. A shutoff of the electric motor 10 can also be accomplished by providing that at least one of the two reversing switches 16, 17 has one further switch contact that leads to neither the first nor the second terminal 18, 19 of the energy source. Regardless of the position of the reversing switches 16, 17, the electric motor 10 can be switched on and off via the switch element 23. The switch element 23 therefore offers a further opportunity of turning off the electric motor 10, regardless of the position of the reversing switches 16, 17.

The switch element 23 is switched on and off by the switching signal 30, which the power specification 31 contained in the control arrangement 27 defines, initially as a function of the positioning signal 32.

The switch element 23 is for instance a semiconductor power component, preferably a transistor embodied for instance as a power MOSFET.

Along with steady-state switching of the switch element 23 on and off, a clocked mode of operation may be provided by means of the switching signal 30, in which mode the switch element 23 is turned on and off in rapid succession in order to specify a mean motor current. The specification of the mean current by the electric motor 10 can be adjusted by varying the clock frequency and/or the duty cycle. The clock frequency and optionally the duty cycle are defined, preferably as a function of the inductance of the electric motor 10. This definition also preferably takes into account the incidence of electromagnetic interfering radiation, something that should as much as possible avoided.

An overload state of the adjusting device 10, 11, 12 occurs for instance in sluggish operation, on reaching a mechanical end stop, or if articles or persons become caught. Detecting such an overload state is done for instance by evaluating the current flowing through the electric motor 10. The current flowing through the electric motor 10 is at least approximately a standard of the torque furnished by the electric motor. Increasing the accuracy can be achieved for instance by detecting the temperature of the electric motor 10, which can be used to correct the motor current. The current flowing through the electric motor 10 is therefore equally a standard for the adjusting force or adjusting torque with which the part 12 to be adjusted is moved.

Another option for detecting an overload state uses an rpm or a speed that occurs in the adjusting device 10, 11, 12. The ascertained rpm is equally a standard for the adjusting force or adjusting torque with which the part 12 to be adjusted is moved.

To detect the motor current, sensors that detect the magnetic field accompanying the current are especially suitable. Examples of such sensors are Hall effect sensors, magnetoresistive elements, or inductive sensors. The advantage of these sensors is that they require no intervention into the current-carrying lines.

In the exemplary embodiment, a current sensor is shown that furnishes a signal voltage, representing the motor current, on the basis of a voltage drop occurring at a resistor. Such a sensor is an ohmic resistor, for instance, which is intended to have a low resistance in view of the high motor current. The exemplary embodiment is set up for detecting the voltage drop U that occurs at the switch element 23. This current detection has the advantage that a separate sensor can be dispensed with. The switch element 23 is preferably a power MOSFET with a low resistance in the ON state. The relationship between the voltage drop U and the current flowing through the field effect transistor is sufficiently linear for the intended application. Optionally, an electronic distortion can be performed. The voltage drop U is decoupled from the line 22 at the pickup 33 and supplied to both the motor current evaluator 35 and the rpm detector 34.

The motor current evaluator 35 ascertains a characteristic variable of the motor current; for example, the absolute level of the motor current and/or the change over time of the motor current and/or the location-related change in the motor current can be taken into account.

The characteristic variable 42 ascertained in the motor current evaluator 35 is compared in the characteristic variable comparator with the characteristic variable limit value 44. By way of example, the characteristic variable limit value 44 may be a fixedly specified number. Preferably, the characteristic variable limit value 44 depends on the electrical voltage of the energy source not shown in the drawing, to which the electric motor 10 can be connected via the two terminals 18, 19. The characteristic variable limit value 44 also preferably depends on the position $P_M$ of the part 12 to be adjusted. The influence is exerted via the position signal $P_E$. With this provision, positions $P_M$ or positional ranges $P_A$, $P_B$, $P_C$ of the part 12 to be adjusted, which may require an increased adjusting force, are taken into account in the definition of the characteristic variable limit value 44. If a threshold is exceeded in the sense of an exceeding of the characteristic variable limit value 44 on the part of the characteristic variable 42, then the characteristic variable comparator 43 outputs the second overload signal 45.

The rpm detector 34 ascertains an rpm of the adjusting device 10, 11, 12, in the exemplary embodiment shown doing so on the basis of the ripple W of the motor current. The ripple W in the motor current is caused by commutation events in the electric motor 10 and accordingly depends on the structural design of the electric motor 10. The number of waves during one revolution of the electric motor 10 is fixed by its construction.

The evaluation of the ripple W of the motor current is prepared in the signal preparing means 37. The capacitor 36 inserted in the signal flow direction upstream of the signal preparing means 37 expresses the fact that of the voltage drop U occurring at the pickup 13, only the alternating portions are needed. By way of example, the signal preparing means 37 includes an amplifier circuit and preferably signal filter circuits, which free the ripple of the motor current of superimposed higher- and lower-frequency signal components. The signal preparing means 37, on its output side, preferably includes a signal converter, which from the sinusoidal course of the motor current furnishes a square signal that is well-suited to further signal processing.

The square signal, which occurs in the form of a ripple signal 46, can be evaluated in the rpm detector 34 by ascertaining the time between the changes of level and converted into the output signal 38, which is a standard for an rpm occurring in the adjusting device 10, 11, 12. The output signal 38 is at the same time a standard for the speed of the part 12 to be adjusted or of some other part inside the adjusting device 10, 11, 12. The rpm-referred values are therefore also speed-referred values. The output signal 38 is compared in the rpm comparator 33 with the rpm limit value 40. As in the case of the characteristic variable limit value 44, the rpm limit value 40 may also be a fixedly specified number or preferably a value that depends on other variables. Along with the dependency on the operating voltage, a dependency on the position $P_M$ of the part 12 to be adjusted via the position signal $P_E$ is preferably provided. If the limit value is exceeded in the direction of being undershot, the rpm comparator 39 outputs the first overload signal 41.

The first and/or second overload signal 41, 45 can be used in various ways. Along with a visual and/or acoustical alarm, a shutoff of the electric motor 10 is preferably contemplated. Another step that may be provided, for instance in accordance with the position $P_M$ of the part 12 to be adjusted, contemplates the reversal of the rotational direction of the electric motor 10. With the reversal, which may be limited to a specified time or a specified adjustment travel, caught objects or body parts of persons, for instance, are released. The first and/or overload signal 41, 45, in order to perform this task, must be connected in the exemplary embodiment shown to the control arrangement 27. The corresponding control signals 24, 25 and the switching signal 30 are defined in accordance with the emergency provision contemplated.

The specification of limit values 40, 44, which optionally depend on other variables, such as the operating voltage or the position $P_M$ of the part 12 to be adjusted or a temperature, make it possible to limit the adjusting force or adjusting torque. Different algorithms in the motor current evaluator 35 in defining the standard 42 or in the rpm detector 34 in defining the output signal 38 make it possible to detect different events where something is caught. If necessary, a plurality of comparators 39, 43 that each have different limit values 40, 41 should be provided. These provisions make it possible to distinguish between soft and hard catching events. A soft catching event, in which the part 12 to be adjusted can cover a comparatively long adjustment travel path until a specified maximum catching force occurs is in general easy to control, since there is enough time available after the soft catching event is detected to turn off the electric motor 10 or reverse its direction of rotation. It is more difficult to control hard catching events, in which a reduction in the catching force to the maximum allowed value must be achieved within a comparatively short adjustment travel path. A high spring rate, which indicates the change in force along the travel path covered until one of the overload signals 41, 45 occurs, must therefore be achievable in order to control the hard catching event. The provision contemplated according to the invention of defining the electrical power, made available to the electric motor 10 of the adjusting device 10, 11, 12, to a specified value which is preferably position-independent makes it possible to adhere to a specified spring rate. Existing adjusting devices 10, 11, 12 which do not enable adherence to the specified spring rate can continue to be used with the provision contemplated by the invention, after legal requirements, for instance, have been met. If the definition of the power is done independently of the position of the part 12 to be adjusted, then a reduction in the adjustment speed may have to be accepted into the bargain. Preferably, the power available to the electric motor 10 is dependent on the position of the part to be adjusted, and a division into different ranges $P_A$, $P_B$, $P_C$ continues to be preferably provided. The adjusting device 10, 11, 12 can then operate at the full adjustment speed, in the positions or positional ranges $P_A$, $P_B$, $P_C$ in which no power reduction is contemplated.

The value to which the power for the electric motor 10 is to be fixed is preferably ascertained experimentally. Upon power changes in the direction of a reduction, the definition depends preferably on operating data of the adjusting device 10, 11, 12. Examples of such operating data are the power taken up by the electric motor 10 that is actually taken up at a maximum available power, and the motor current or preferably the rpm. For instance, if an rpm level of 3000 rpm prevails in a positional range $P_A$, $P_B$, $P_C$ and the rpm is to be lowered to a level of 1000 rpm, for instance, in an ensuing positional range $P_A$, $P_B$, $P_C$ then the electrical power made available to the electric motor (10) is defined at an experimentally ascertained value, for instance of 40% of the full power. Conversely, if the rpm level is 2000 rpm, for instance, then the power reduction can be less and is for instance ascertained at 60% of the full power, so as to reduce the rpm again to a level of 1000 rpm. The power specification 31 carries out the definition of the power by means of correspondingly defining the switching signal 30. In the exemplary embodiment shown, the power specification 31 is supplied with the output signal 38 ascertained by the rpm detector 34. The power specification 31 is also supplied with the position-dependent power specification signal 48, which is output by the position comparator 47.

In the exemplary embodiment shown, an incremental position detector is provided. The incremental position detector can have recourse to additional position sensors, such as Hall elements. In the exemplary embodiment, the evaluation of the ripple W of the motor current is provided anyway, so that in this exemplary embodiment the position $P_M$ is intended to be ascertained from the ripple W of the motor current. The ripple signal 46 is therefore supplied to the position detector 29, which includes an up/down counter that counts the number of individual waves. The information about the drive direction is received by the position detector 29 via the rotational direction signal 28. Calibration in the position detector 29 can be done by means of a reference mark, not shown in detail in the drawing, which is located inside the adjusting device 10, 11, 12 or on the part 12 to be adjusted. A further calibration option is provided by the approach to a specified position $P_M$ and corresponding setting of the counter present in the position detector 29. For instance, the part 12 to be adjusted can be moved to one of the mechanical end stops 14, 15, the attainment of which is indicated by the occurrence of at least one overload signal 41, 45. With at least one of the overload signals 41, 45, the counter included in the position detector 29 can be set to a counter state of zero, for instance. The position detector 29 outputs the position $P_M$ of the part 12 to be adjusted in the form of a position signal $P_E$.

The adjustment travel of the part 12 to be adjusted is preferably subdivided into a plurality of positional ranges $P_A$, $P_B$, $P_C$. The position ranges $P_V$ specified for the position comparator 47 can match the positional ranges $P_A$, $P_B$, $P_C$. For instance, it is provided that within the positional range $P_B$, within which neither of the end stops 14, 15 is located, a power reduction is to be provided, compared with the other ranges $P_A$, $P_B$, $P_C$ within which the end stops 14, 15 are located.

The definition of the power is effected with the switching signal 30, which brings about a clocked mode of operation of the switch element 23. In the clocked mode, the switch element 23 is turned on and off in rapid succession in order to specify a mean motor current. The definition of the clock frequency and/or the duty cycle takes place as a function of the position-dependent power specification signal 48 and/or as a function of operating data of the adjusting device 10, 11, 12, of which as an example the rpm ascertained by the rpm detector 34 is shown in the drawing. The power specification 31 for instance includes an analog circuit, which from these signals supplied to it defines the corresponding switching signal 30. Preferably, a digital circuit embodiment is provided, with the functional relationships stored in memory in table form. It is therefore possible to provide both a table for a position-dependent value and at least one table for values dependent on other operating data.

The method of the invention, which is suitable particularly for controlling hard catching events, provides that a continuous variation of a characteristic variable, referred to successive travel intervals I, leads to the tripping of one of the overload signals 41, 45. For instance, a continuous increase of motor current can be effected in the motor current evaluator as a function of the position signal $P_E$ supplied to the motor current evaluator 35.

The travel intervals I can be ascertained from the position signal $P_E$ on the basis of the position change ascertained. An increase in the motor current ascertained in the characteristic variable comparator 43 within a specified number of successive travel intervals I leads to the tripping of the second overload signal 45. Another option is offered by the evaluation of the motor current ripple in the signal preparing means 37. Ascertaining the individual travel intervals I can be omitted here, since the positional information is contained in the ripple W. The interval I' of the individual waves is a direct standard for the individual travel intervals I of the part 12 to be adjusted. Depending on how the entire adjusting device 10, 11, 12 is realized, the interval I' from wave to wave at least approximately corresponds to the specified travel interval I, which should be defined in order to attain a specified position resolution to a certain value.

The travel interval I and correspondingly the interval I' should be defined at a suitably low value, especially to achieve a minimum specified minimum spring rate. The rpm detector 34 ascertains the times between successive intervals I' from the ripple signal 46. If there is a continuous increase in the times required for the individual intervals I' compared with a specified number of intervals I', then the rpm comparator 39 outputs the first overload signal 41. Averaging may possibly be necessary over a plurality of intervals I', for instance to compensate for phase jitter.

The method of the invention for operating the adjusting device 10, 11, 12 should be viewed in conjunction with the definition also provided in accordance with the invention, in particular the reduction of the electrical drive power that is made available to the electric motor 10.

We claim:

1. A circuit arrangement for operating an adjusting device driven by an electric motor, which drives at least one adjustable part at which the danger that an object or body part will become caught originates, said circuit arrangement having; an evaluation arrangement which ascertains at least one characteristic variable of the adjusting device as a standard for the adjusting force or adjusting torque; a comparator for comparing the at least one characteristic variable with at least one limit value and for outputting an overload signal if the limit value is exceeded; and a power specification means (31) for defining the electrical power of the electric motor (10) in the circuit arrangement as a function of a specified spring rate of the article or body part caught to a value that makes it possible to adhere to a specifiable maximum catching force exerted on the caught object or the caught body part.

2. The circuit arrangement of claim 1, furthering including a position detector (29) which furnishes a position signal ($P_E$) that represents a position ($P_M$) of a part (12) to be adjusted of the adjusting device (10, 11, 12), and wherein the power specification means defines the power as a function of the ascertained position ($P_M$).

3. The circuit arrangement of claim 2, wherein the positions ($P_M$) of the part (12) to be adjusted are divided into a plurality of positional ranges ($P_A$, $P_B$, $P_C$), and that a power reduction is contemplated in selected positional ranges ($P_A$, $P_B$, $P_C$).

4. The circuit arrangement of claim 3, wherein a power reduction is contemplated in positional ranges ($P_A$, $P_B$, $P_C$) that contain no end stops (14, 15) of the adjusting device (10, 11, 12).

5. The circuit arrangement of claim 2, wherein the power specification means defines the power dependent on an rpm of the adjusting device (10, 11, 12), which rpm is ascertained by an rpm detector (34) in a position ($P_M$) or in a positional range ($P_A$, $P_B$, $P_C$) in which no power reduction is contemplated.

6. The circuit arrangement of claim 1, wherein the power specification means, in the definition of the electrical power of the electric motor (10), takes operating data of the adjusting device (10, 11, 12) into account.

7. The circuit arrangement of claim 6, wherein the power specification mean takes the opening voltage of the electric motor (10) into account.

8. The circuit arrangement of claim 6, wherein the power specification means takes the at least one ascertained characteristic variable (42, 38) into account as a standard for the adjusting force or adjusting torque of the adjusting device (10, 11, 12).

9. The circuit arrangement of claim 6, wherein the power specification means takes the power supplied to the electric motor (10) into account in positions ($P_M$) of the part (12) to be adjusted in which no power reduction is contemplated.

10. The circuit arrangement of claim 6, wherein the power specification means takes the current flowing through the electric motor (10) into account in positions ($P_M$) of the part (12) to be adjusted in which no power reduction is contemplated.

11. The circuit arrangement of claim 1, wherein the standard for the adjusting force or adjusting torque of the adjusting device (10, 11, 12) is derived from the current flowing through the electric motor (10).

12. The circuit arrangement of claim 11, wherein the standard for the adjusting force or adjusting torque is derived from the ripple of the motor current.

13. The circuit arrangement of claim 12, wherein the ripple (W) of the motor current is derived from a voltage drop (U) that occurs at a semiconductor power component (23) through which the motor current flows.

14. The circuit arrangement of claim 1, wherein the standard for the adjusting force or adjusting torque is derived from an rpm that occurs inside the adjusting device (10, 11, 12).

15. The circuit arrangement of claim 1, furthering including a position detector (29) which ascertains the position ($P_M$) of the part (12) to be adjusted from the ripple (W) of the motor current.

16. The circuit arrangement of claim 1, wherein the power specification means (31) specifies a reduced electrical power with a clocked mode of operation of a power semiconductor component (23), in which by periodically turning the semiconductor power component (23) on and off, the mean current flowing through the electric motor (10) is specified.

17. A method for operating an adjusting device driven by an electric motor, which drives at least one adjustable part at which the danger that an object or body part will become caught originates, said method comprising at least the following steps by using an evaluation arrangement, ascertaining at least one characteristic variable of the adjusting device as a standard for the adjusting force or adjusting torque; comparing the at least one variable with at least one limit value and outputting an overload signal if the limit value is exceeded; by use of a position detector, furnishing a position signal that represents a position of a part to be adjusted of the adjusting device; defining the electrical power made available to the electric motor (10) as a function of a specified spring rate of a caught object or body part, at a value that makes it possible to adhere to a specifiable maximum catching force; subdividing the adjustment travel of the part (12) to be adjusted into a predetermined number of travel path; intervals (I), whose length is considerably shorter than the total adjustment travel path and further outputting an overload signal if, in a specified number of successive travel path intervals (I), a continuous change in the ascertained standard for the adjusting force or adjusting torque in the direction of exceeding a limit value has occurred.

18. The method of claim 17, further including using the intervals (I') between waves of a ripple signal (46) derived from the motor current as a standard for the travel intervals (I).

19. The method of claim 17, wherein the adjusting device (10, 11, 12) is disposed in a motor vehicle.

20. The method of claim 17, further including using the adjusting device (10, 11, in a motor vehicle.

\* \* \* \* \*